US009172525B2

(12) United States Patent
Cao et al.

(10) Patent No.: US 9,172,525 B2
(45) Date of Patent: Oct. 27, 2015

(54) METHOD AND DEVICE FOR COMPENSATING FOR TIME PATH

(71) Applicant: Huawei Technologies Co., Ltd., Shenzhen (CN)

(72) Inventors: Dezhong Cao, Chengdu (CN); Buyun Wang, Chengdu (CN); Guojie Pan, Chengdu (CN); Chao Su, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 13/847,101

(22) Filed: Mar. 19, 2013

(65) Prior Publication Data
US 2013/0216218 A1     Aug. 22, 2013

Related U.S. Application Data

(63) Continuation of application No. PCT/CN2012/071386, filed on Feb. 21, 2012.

(51) Int. Cl.
H04B 10/00     (2013.01)
H04L 7/04      (2006.01)
H04J 3/06      (2006.01)

(52) U.S. Cl.
CPC ............ *H04L 7/04* (2013.01); *H04J 3/0673* (2013.01)

(58) Field of Classification Search
USPC ................................. 398/154–156
See application file for complete search history.

(56) References Cited

U.S. PATENT DOCUMENTS

| 7,126,800 | B2 * | 10/2006 | Premerlani et al. | 361/68 |
| 7,602,873 | B2 * | 10/2009 | Eidson | 375/371 |
| 7,787,438 | B2 * | 8/2010 | Dowse | 370/350 |
| 8,018,972 | B2 * | 9/2011 | Roberts et al. | 370/507 |
| 8,472,370 | B2 * | 6/2013 | Shin et al. | 370/326 |
| 8,594,134 | B2 * | 11/2013 | Zampetti et al. | 370/503 |

(Continued)

FOREIGN PATENT DOCUMENTS

| CN | 101989906 A | 3/2011 |
| CN | 102201983 A | 9/2011 |

(Continued)

OTHER PUBLICATIONS

International Search Report issued in corresponding PCT Patent Application No. PCT/CN2012/071386, mailed Nov. 29, 2012.

(Continued)

*Primary Examiner* — Agustin Bello
(74) *Attorney, Agent, or Firm* — Brinks Gilson & Lione (57) ABSTRACT

Embodiments of the present disclosure relate to a method and a device for compensating for a time path. In the embodiments of the present disclosure, on the basis of not changing implemented 1588 synchronization architecture, a compensation unit is added on a service board unit, the compensation unit calculates a compensation time value for asymmetrical reception and transmission of fiber links and transfers the compensation time value into the service board unit, and the service board unit implements automatic compensation according to a port status. The method and the device for compensating for a time path according to the embodiments of the present disclosure may implement automatic compensation for receiving and sending fiber links without manually testing the asymmetry of links node by node, so that the embodiments of the present disclosure can be widely applied in time synchronization networks.

6 Claims, 6 Drawing Sheets

(56) References Cited

U.S. PATENT DOCUMENTS

| | | | |
|---|---|---|---|
| 8,718,482 B1* | 5/2014 | Roberts et al. | 398/161 |
| 2005/0232384 A1* | 10/2005 | Heid et al. | 375/354 |
| 2007/0127919 A1* | 6/2007 | Kallstenius | 398/25 |
| 2008/0075121 A1 | 3/2008 | Fourcand | |
| 2008/0151771 A1* | 6/2008 | Dowse | 370/252 |
| 2009/0147806 A1* | 6/2009 | Brueckheimer | 370/503 |
| 2010/0085989 A1* | 4/2010 | Belhadj et al. | 370/503 |
| 2011/0299853 A1* | 12/2011 | Zampetti et al. | 398/98 |
| 2012/0131378 A1 | 5/2012 | Jiang et al. | |
| 2013/0202291 A1* | 8/2013 | Cavaliere et al. | 398/33 |
| 2013/0216218 A1* | 8/2013 | Cao et al. | 398/25 |
| 2013/0315606 A1* | 11/2013 | Lanzone et al. | 398/154 |
| 2013/0322872 A1* | 12/2013 | Jobert et al. | 398/25 |
| 2014/0219651 A1* | 8/2014 | Ruffini et al. | 398/33 |
| 2014/0226984 A1* | 8/2014 | Roberts et al. | 398/66 |
| 2014/0270805 A1* | 9/2014 | Mani | 398/155 |

FOREIGN PATENT DOCUMENTS

| | | |
|---|---|---|
| CN | 102291178 A | 12/2011 |
| WO | WO 2011/079460 A1 | 7/2011 |

OTHER PUBLICATIONS

Garner, IEEE 1588 Version 2, ISPCS, Ann Arbor, Sep. 24, 2008.

* cited by examiner

| Bits | | | | | | | | Number of bytes | Byte offset |
|---|---|---|---|---|---|---|---|---|---|
| 7 | 6 | 5 | 4 | 3 | 2 | 1 | 0 | | |
| Header ||||||||| 3 | 0 |
| transportSpecific |||| messageType |||| 1 | 3 |
| PDelayRespFlag |||| versionPTP |||| 1 | 4 |
| Resp_send_offset ||||||||| 4 | 5 |
| Req_receive_offset ||||||||| 4 | 9 |
| SequenceID ||||||||| 1 | 13 |
| Timestamp T2 ||||||||| 10 | 14 |
| Timestamp T3 ||||||||| 10 | 24 |
| Reserved ||||||||| 10 | 34 |
| Check (optional) ||||||||| 1 | 44 |

METHOD AND DEVICE FOR COMPENSATING FOR TIME PATH

CROSS-REFERENCE TO RELATED APPLICATIONS

This application is a continuation of International Application No. PCT/CN2012/071386, filed on Feb. 21, 2012, which is hereby incorporated by reference in its entirety.

FIELD

The present disclosure relates to the field of communications, and in particular, to a method and a device for compensating for a time path.

BACKGROUND

In a mobile communications system, to guarantee the service quality of wireless communications, a communications network and communications equipment have strict requirements for clock synchronization; and in particular, with the development of the third generation mobile communications technology in the mobile communications network, the mobile communications system has more strict requirements for the precision of clock synchronization.

Figure 1:
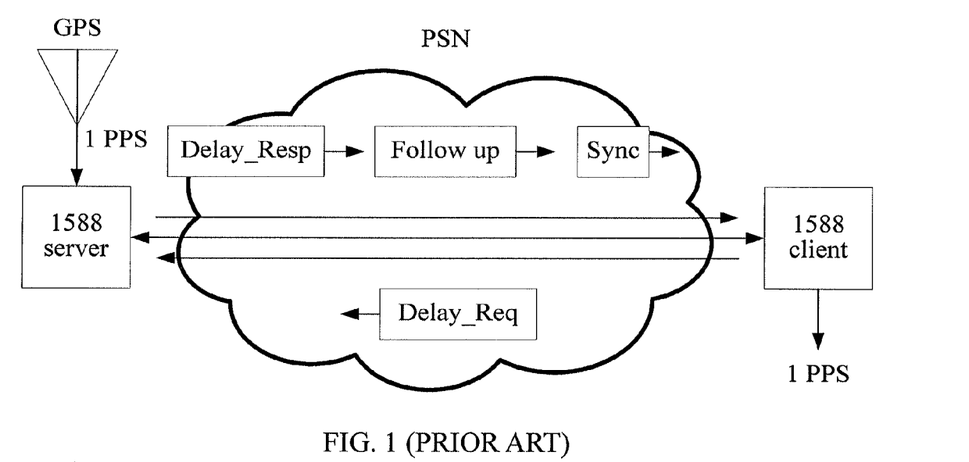
FIG. 1 is a principle diagram of time synchronization of the IEEE 1588 V2 protocol.

The IEEE 1588 V2 protocol is a protocol of frequency and time synchronization, the full name of the IEEE 1588 V2 protocol is the Precision Clock Synchronization Protocol for Networked Measurement and Control Systems, or the PTP protocol for short. The IEEE 1588 V2 protocol is a universal standard for improving timing synchronization capability of network systems, provides strict timing synchronization for distributed communications networks and is applied in industrial automation systems. By adopting the 1588 V2 protocol, the precision may reach a sub-microsecond level. FIG. 1 shows a main principle of time synchronization of the protocol, of which a basic idea is to synchronize an internal clock of a piece of network equipment (a client) and a master clock of a master controller through hardware and software, and provide an application of which synchronization establishing time is less than 1 μs, so as to remarkably improve the timing synchronization index of an entire network.

Generally, for communications nodes in the mobile communications system, each node needs at least two fiber links to reach a neighboring node: one is a receiving link and the other is a sending link. A basis for implementing precise time synchronization between nodes through the 1588 protocol is that the receiving and sending fiber links of a node need have equal lengths. If the lengths of the receiving and sending fiber links are not equal, asymmetric compensation should be performed for the fibers, otherwise the inconsistency between the receiving and sending fiber links may have serious impacts on the precision of time synchronization. In this case, asymmetry between the receiving fiber link and the sending fiber link needs to be measured.

Figure 2:
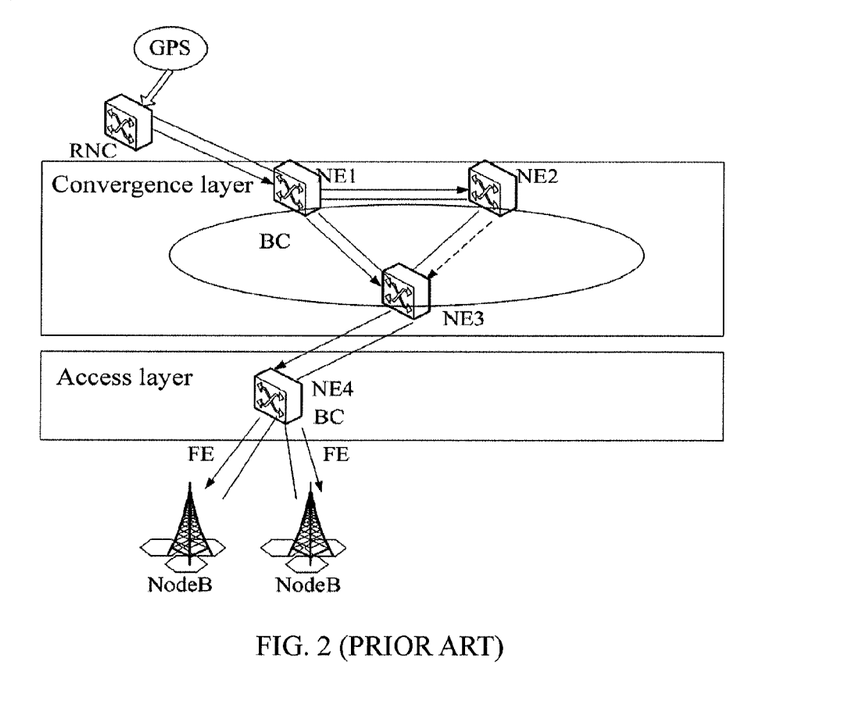
FIG. 2 is a principle diagram of node-by-node measurement and compensation that use the GPS in the prior art.

In a current solution, the GPS is used to perform node-by-node measurement and compensate the fibers with an asymmetric value. As shown in FIG. 2, the asymmetry of fibers between nodes NE1 to NE4 is measured node by node, and the asymmetric value is compensated with according to a measurement result. The prior art has three defects: nodes NE1 to NE4 all need to be measured on site, which leads to a heavy workload; the GPS should guarantee that a satellite is in the visual range of a receiver, and when a base station is placed in a site which is not suitable for deploying a GPS antenna, such as a basement or a metro station, it is difficult to carry out on-site measurement; and the most important point is that a fiber may change after the fiber is disconnected in a node and the measurement needs to be performed again on site.

For the foregoing measurement of the fibers and asymmetric value compensation for the fibers, it is found that this method has the following problems: every node needs to be measured on site, which leads to a heavy work load, and the measurement needs to be performed again on site when a fiber is disconnected in a node. Therefore, the operability of the prior art is rather poor.

SUMMARY

Embodiments of the present disclosure provide a method and a device for compensating for a time path, so as to compensate, efficiently, accurately, and in real time, for a time tracking offset caused by asymmetry between receiving and sending fiber links.

In a first aspect, a method for compensating for a time path provided by an embodiment of the present disclosure includes: receiving a first time stamp that is sent through a first fiber by a service board unit; receiving a second time stamp that is sent through a second fiber by a compensation unit; calculating a path delay of the first fiber according to the first time stamp, calculating a path delay of the second fiber according to the second time stamp, and using a half of a difference between the path delay of the first fiber and the path delay of the second fiber as a path compensation time value; and sending, according to the path compensation time value, a data message including the path compensation time value.

In a second aspect, a device for compensating for a time path provided by an embodiment of the present disclosure includes: a first receiving unit, configured to receive a first time stamp that is sent through a first fiber by a service board unit; a second receiving unit, configured to receive a second time stamp that is sent through a second fiber by a compensation unit; a processing unit, configured to calculate a path delay of the first fiber according to the first time stamp, calculate a path delay of the second fiber according to the second time stamp, and use a half of a difference between the path delay of the first fiber and the path delay of the second fiber as a path compensation time value; and a data sending unit, configured to send, according to the path compensation time value, a data message including the path compensation time value.

In a third aspect, a device for compensating for a time path provided by an embodiment of the present disclosure includes: a service board unit, configured to receive a first time stamp that is sent through a first fiber by another service board unit, and send the first time stamp to a compensation unit; and the compensation unit, configured to receive a second time stamp that is sent through a second fiber by another compensation unit, calculate a path delay of the first fiber according to the first time stamp, calculate a path delay of the second fiber according to the second time stamp, use a half of a difference between the path delay of the first fiber and the path delay of the second fiber as a path compensation time value, and send the path compensation time value to the service board unit, so that the service board unit sends, according to the path compensation time value, a message including asymmetric compensation data to a peer end service board unit; where the service board unit determines, according to a port status, whether to perform compensation.

By applying the method and device disclosed in the embodiments of the present disclosure, the device for compensating for a time path may calculate a path compensation time value, and the service board unit may automatically compensate for an offset of the fibers according to a calculated path compensation time value.

DETAILED DESCRIPTION OF THE EMBODIMENTS

Figure 3:
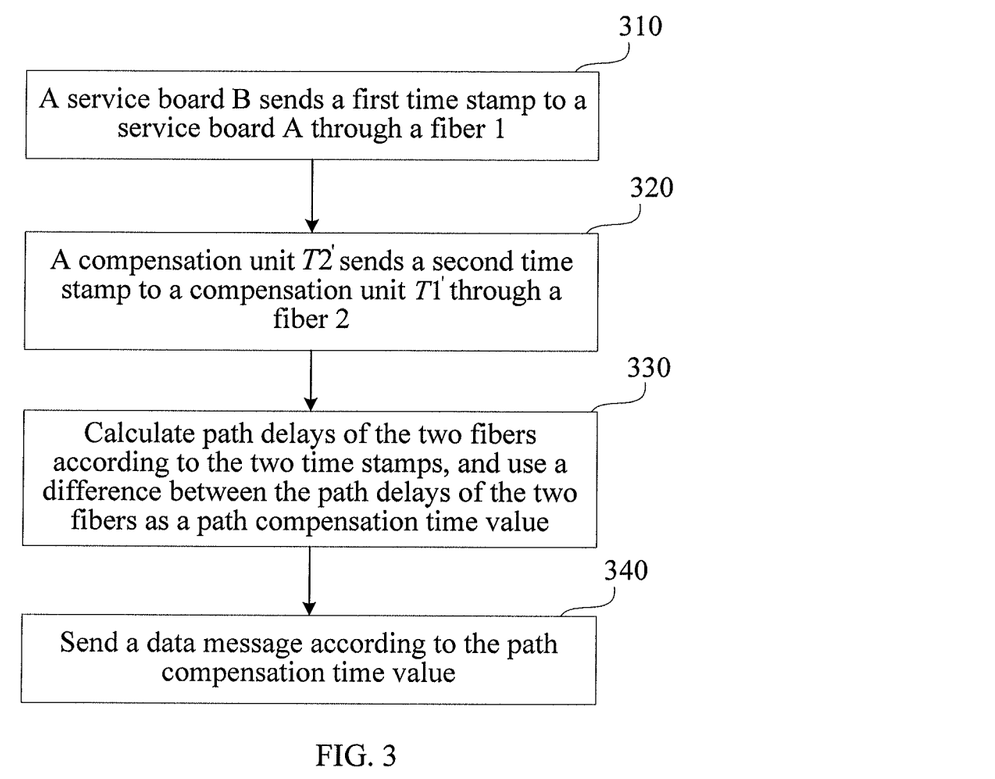
FIG. 3 is a flow chart of a method for compensating for a time path according to an embodiment of the present disclosure.

To illustrate the solutions and advantages of the embodiments of the present disclosure more clearly, the solutions of the present disclosure are to be described further in detail with reference to the accompanying drawings and embodiments. FIG. 3 is a flow chart of a method for compensating for a time path according to an embodiment of the present disclosure. As shown in FIG. 3, the method for compensating for a time path needs to be implemented through the following steps, which include:

Step 310: A service board unit B sends a first time stamp to a service board unit A through a fiber 1.

For example, the service board unit A (hereafter referred to as service board A for short) and the service board unit B (hereafter referred to as service board B for short) activate the 1588 V2 protocol, and the two service board units perform 1588 V2 time synchronization through a first fiber (hereafter referred to as fiber 1 for short) and a second fiber (hereafter referred to as fiber 2 for short). Because lengths of receiving and sending links of the fiber 1 and the fiber 2 are not equal, a fixed offset offset0 exists. The service board A and the service board B each are added with a compensation unit. The service board A and a compensation unit T2' are connected through a fiber A, and the service board B and a compensation unit T1' are connected through a fiber B. The service board B sends the first time stamp to the service board A through the fiber 1.

The fixed offset offset0 is an offset formed due to unequal data transmission time of a receiving fiber link and a sending fiber link, and the time stamp means that when a data sender sends a data packet to a data receiver, specific time of sending data is also encapsulated in the data packet to be sent.

Step 320: The compensation unit T1' sends a second time stamp to the compensation unit T2' through the fiber 2.

Step 330: Calculate a path delay of the first fiber according to the first time stamp, calculate a path delay of the second fiber according to the second time stamp, and use a half of a difference between the path delay of the first fiber and the path delay of the second fiber as a path compensation time value.

For example, the compensation unit T2' may calculate the delays of the two fibers according to the two time stamps; the compensation unit T2' sends a calculated delay difference to the service board A, and the compensation unit T2' uses a half of the calculated delay difference as asymmetric data, that is, a compensation time value.

Step 340: Send, according to the path compensation time value, a data message including the path compensation time value.

The service board A transfers the compensation time value to the service board B through a message. For the service board A or the service board B, if a port connected to the fiber 1 or the fiber 2 is in a Slave status, asymmetric compensation is performed for the fibers according to the compensation time value, that is, local time is corrected by using "compensation time value" data so as to solve the problem of asymmetric receiving and sending links of the fiber 1 and the fiber 2; if the port connected to the fiber 1 or the fiber 2 is not in the Slave status, the asymmetric compensation is not performed for the fibers.

Figure 5:
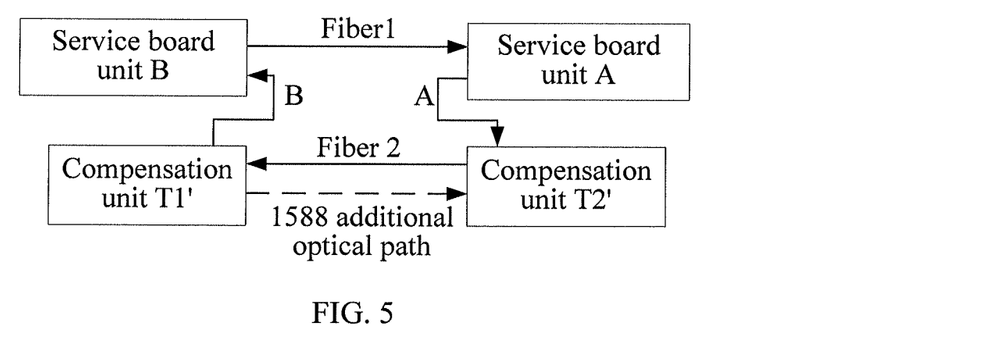
FIG. 5 is a corresponding block diagram of a method for compensating for a time path according to an embodiment of the present disclosure.

Detailed descriptions of the solutions are further provided below with reference to FIG. 5.

Figure 4:
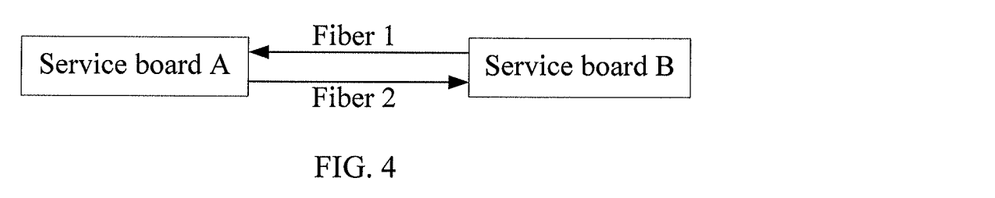
FIG. 4 is a block diagram of time path compensation in the prior art.

In an embodiment of the present disclosure, FIG. 4 is a block diagram of time path compensation in the prior art. As shown in FIG. 4, in the prior art, a time tracking device only includes a service board unit A and a service board unit B. FIG. 5 is a corresponding block diagram of a method for compensating for a time path according to an embodiment of the present disclosure. As shown in FIG. 5, a service board unit A and a service board unit B activate the 1588 V2 protocol, and the two service board units perform 1588 V2 time synchronization through a fiber 1 and a fiber 2. Because lengths of receiving and sending links of the fiber 1 and the fiber 2 are not equal, a fixed offset offset0 exists. The service board A and the service board B each are added with a compensation unit. The service board A and a compensation unit T2' are connected through a fiber A, and the service board B and a compensation unit T1' are connected through a fiber B. Multiplex processing is performed on the fiber 2 (an optical signal that is sent by the compensation unit T1' to the compensation unit T2', and an optical signal that is sent by the service board A to the service board B through the fiber A, the compensation unit T2', the fiber 1, and the fiber B in sequence). The service board B and the compensation unit T1' send a first time stamp and a second time stamp respectively to the service board A and the compensation unit T2' through the fiber 1 and the fiber 2, the service board A sends a received first time stamp to the compensation unit T2' through the fiber A, and the compensation unit T2' may calculate delays of the two fibers according to the two time stamps. The compensation unit T2' sends a calculated delay difference to the service board A, and the service board A uses a half of the calculated delay difference as asymmetric data, that is, a compensation time value. The service board A transfers the compensation time value to the service board B through a message, a message format being shown in FIG. 6. For the service board A or the service board B, if a port connected to the fiber 1 and the fiber 2 is in a Slave status, asymmetric compensation is performed for the fibers, that is, local time is corrected by using "compensation time value" data so as to solve the problem of asymmetric receiving and sending links of the fiber 1 and the fiber 2.

Figure 6:
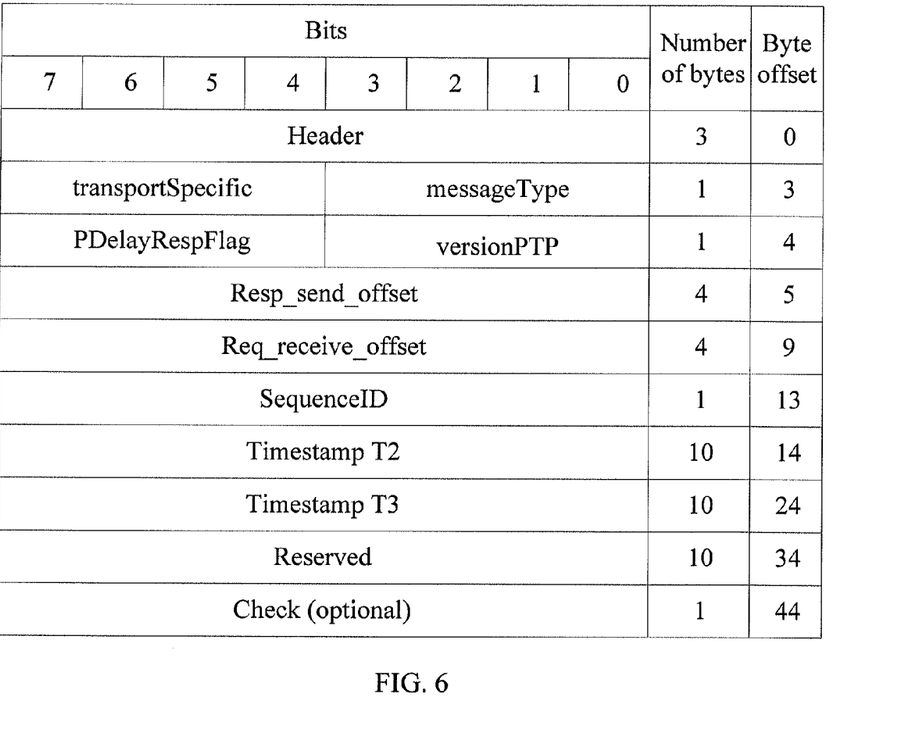
FIG. 6 is a diagram of a message format according to an embodiment of the present disclosure.

FIG. 6 is a diagram of a message format according to an embodiment of the present disclosure. As shown in FIG. 6, the service board A receives the compensation time value calculated by the compensation unit T2', and when a port of the service board A is a master port, the service board A transfers the compensation time value through reserved (Reserved) bytes in a Resp message.

In the Resp message, a PDelayRespFlag byte is reserved, and a resp message type carrying a compensation value is added. A bit6 of a PDelayRespFlag field is used; when the value of the bit6 is 0, it indicates that the resp message is a normal one, and when the value of the bit6 is 1, it indicates that the resp message carries the compensation time value.

In the Resp message, reserved bytes are reserved, where the most significant bit of a byte having a byte offset of 34 is used for storing a compensation direction: 0 represents a positive direction (the service board A sends to the service board B), and 1 represents a negative position (the service board B sends to the service board A); low seven bits of the byte having a byte offset of 34 and a byte having a byte offset of 35 are used for storing a second value of the compensation value; four bytes having byte offsets of 36 to 39 are used for storing a nanosecond value of the compensation value.

In the embodiment of the present disclosure, multiplex processing is a communications technology in which a series of optical signals that carry information but have different wavelengths are synthesized into a beam, and transmitted along a single fiber, and at a receiving end, the optical signals having different wavelengths are separated by a certain method. In this technology multiple signals may be transmitted in a fiber at the same time, with each signal being transferred by light having a certain wavelength. For multiplex processing, generally a wavelength multiplexer and de-multiplexer (that is, multiplexer/de-multiplexer) are disposed on two ends of the fiber separately so as to implement coupling and separation of different optical waves.

Figure 7:
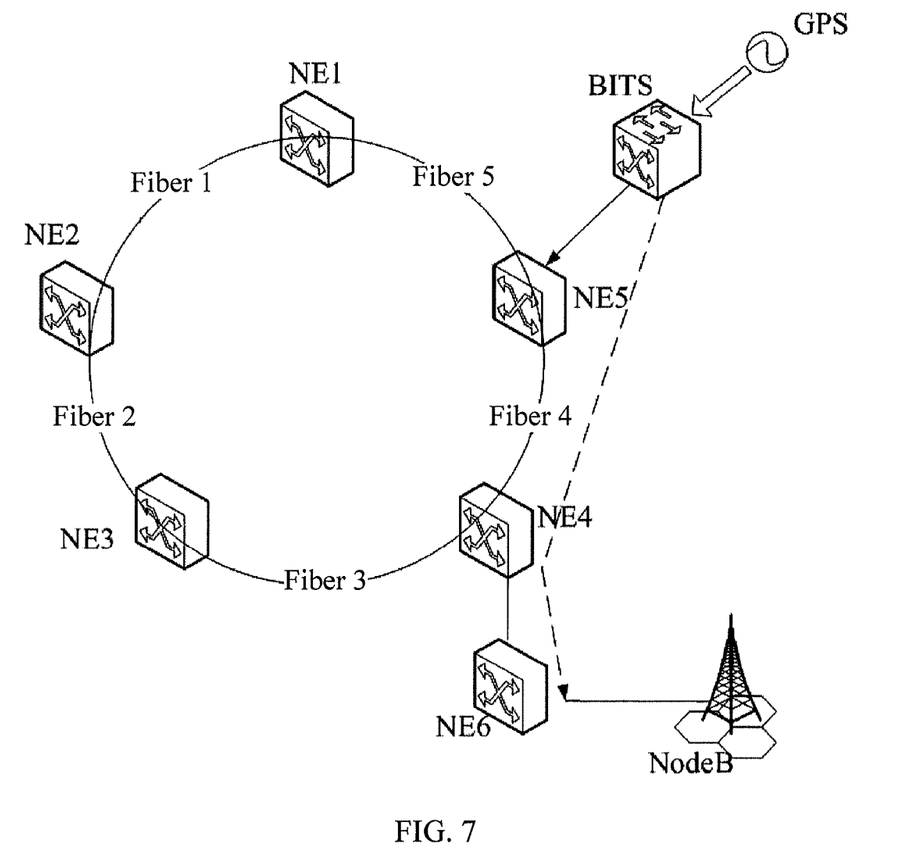
FIG. 7 is a networking diagram of a method for compensating for a time path according to an embodiment of the present disclosure.

In the embodiment of the present disclosure, after the forgoing method for compensating for a time path is applied, a networking diagram of a corresponding solution in a practical application is shown in FIG. 7. FIG. 7 is a networking application diagram of a solution for compensating for a time path according to an embodiment of the present disclosure.

A building integrated timing system (Building Integrated Timing System, BITS) serves as a time source input and is controlled by a synchronization reference (or a GPS signal) from an upper layer network. In FIG. 7, the building integrated timing system is controlled by a GPS signal from the upper layer network. The building integrated timing system (BITS) refers to that every communications building has a master clock, and other clocks in the building is synchronized by the master clock. The grade of the master clock should be equal to or higher than that of clocks of switch equipment in the building.

In FIG. 7, network elements NE1, NE2, NE3, NE4, NE5, and NE6 each are network elements in a transfer path. The network elements NE1 and NE2 are connected through a fiber pair 1, the network elements NE2 and NE3 are connected through a fiber pair 2, the network elements NE3 and NE4 are connected through a fiber pair 3, the network elements NE4 and NE5 are connected through a fiber pair 4, the network elements NE5 and NE1 are connected through a fiber pair 5, and the network element NE6 is connected to the network element NE4 through a fiber pair 6. The network element NE6 tracks clock and time information of the network element NE4, and a tracking path of the network element NE6 is represented by dashed lines in FIG. 6. A node B is connected to the network element NE6. The implementation process is described as follows:

The BITS serves as a time source input and is controlled by a GPS signal from the upper layer. The network elements NE1 to NE6 activate the 1588 V2 protocol to perform time synchronization. It is assumed that the fiber pair 1, the fiber pair 2, the fiber pair 3, the fiber pair 4, the fiber pair 5, and the fiber pair 6 are all in a symmetric receiving and sending status. The network element NE5 is controlled by the master clock of the BITS, that is, the BITS master clock first activates the 1588 V2 protocol to perform time synchronization with the network element NE5, so as to synchronize time of a clock of the network element NE5 and the BITS master clock. The network element NE5 and the network element NE1 are connected through the fiber pair 5, and the network element NE1 activates the 1588 V2 protocol to perform time synchronization with the network element NE5, so that the network element NE1 tracks the clock and time information of the network element NE5. The network element NE1 and the network element NE2 are connected through the fiber pair 1, and the network element NE2 activates the 1588 V2 protocol to perform time synchronization with the network element NE1, so that the network element NE2 tracks the clock and time information of the network element NE1. The network element NE4 and the network element NE5 are connected through the fiber pair 4, the network element 5 already activates the 1588 V2 protocol and is controlled by the BITS master clock, the receiving and sending of the fiber pair 4 are symmetric, and after the network element NE4 and the network element NE5 activate the 1588 V2 protocol through the fiber pair 4, the network element NE4 tracks the clock and time information of the network element NE5. The network element NE3 is connected to the network element NE4 through the fiber pair 3 and connected to the network element NE2 through the fiber pair 2. Because the network element NE3 may be synchronized with the master clock of the network element NE5 through the network element NE4, the network element NE3 activates the 1588 V2 protocol to perform time synchronization with the network element NE4, so that the network element NE3 tracks the clock and time information of the network element NE4. Therefore, the network elements NE1 to NE5 are all synchronized with the time of the master clock.

The network element NE6 and the network element NE4 are connected through the fiber pair 6 and activate the 1588 V2 protocol to perform time synchronization, and a tracking path of the network element NE6 is represented by a dashed curve in FIG. 7. In FIG. 7, the dashed curve is the tracking path of the network element NE6. The BITS master clock controls clock synchronization with the network element NE5. In the symmetric receiving and sending status of the fiber pair 4, the network element NE5 and the network element NE4 activate the 1588 V2 protocol through the fiber 4 so as to synchronize the time of the network element NE4 and the network element NE5, that is, the network element NE4 is also synchronized with the time of the BITS master clock. The network element NE4 and the network element NE6 activate the 1588 V2 protocol through the fiber 6 so as to synchronize the time of the network element NE4 and the network element NE6, that is, the network element NE6 is also synchronized with the time of the BITS master clock.

In the implementation process described above, it is assumed that the 1588 V2 protocol is activated when the fiber pair 1, the fiber pair 2, the fiber pair 3, the fiber pair 4, the fiber pair 5, and the fiber pair 6 are all in the symmetric receiving and sending status, so as to synchronize the time of each distributed clock and the BITS master clock.

In the fiber pair 1, the fiber pair 2, the fiber pair 3, the fiber pair 4, the fiber pair 5, and the fiber pair 6, assuming that the receiving and sending of the fiber pair 4 are asymmetric, that is, a fixed offset offset0 exists in the fiber pair 4, and the network element NE4 and the network element NE5 each are deployed with a compensation unit. The compensation units of the network element NE4 and the network element NE5 may calculate the asymmetry of the receiving and sending of the fiber pair 4 and obtain asymmetric data, that is, the fixed offset offset0 of the fiber pair 4. In a SLAVE port of the network element NE4, the asymmetric compensation data takes effect, so that the network element NE4 and the network element NE5 complete absolute time synchronization, and are both synchronized with the time of the BITS clock.

Figure 8:
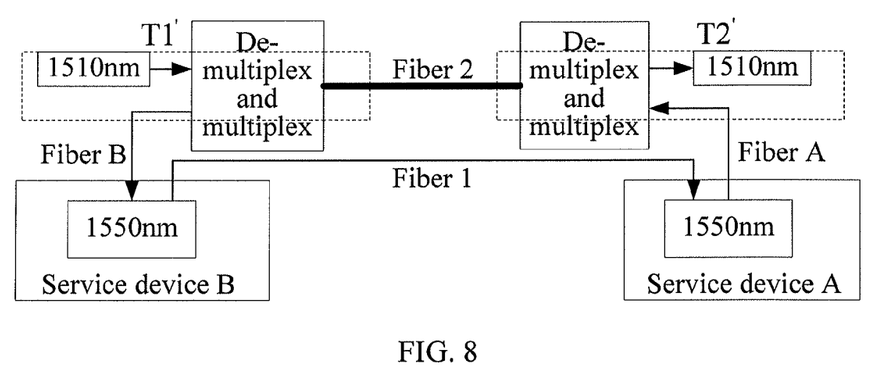
FIG. 8 is an application diagram of a device for compensating for a time path according to an embodiment of the present disclosure.

FIG. 8 is an application diagram of a device for compensating for a time path according to an embodiment of the present disclosure.

The device for compensating for a time path provided by the embodiment of the present disclosure is described in detail below by taking FIG. 8 as an example and with reference to FIG. 5, where fiber compensation may be implemented automatically through the device for compensating for a time path without testing an asymmetry node by node.

Figure 9:
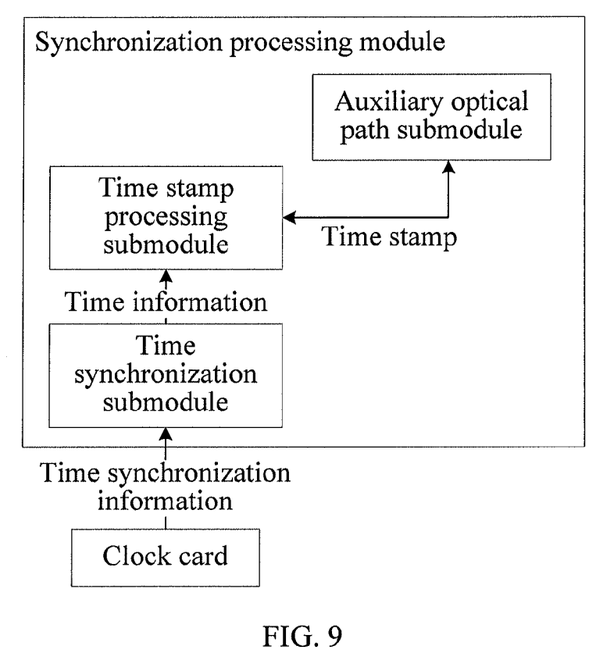
FIG. 9 is an internal block diagram of a synchronization processing module according to an embodiment of the present disclosure.

The device for compensating for a time path as shown in FIG. 8 is a solution proposed to solve a problem in 40-80 Km. To solve a problem in 0-40 Km, other solutions may be used. A compensation unit T2' and a compensation unit T1' are respectively added to the service board A and the service board B shown in FIG. 5. The compensation unit includes a de-multiplexing and multiplexing module and a synchronization processing module, where the de-multiplexing and multiplexing module mainly functions to perform de-multiplex and multiplex processing on an optical wave on the service board A or the service board B and an optical wave on the compensation unit; and the synchronization processing module is mainly configured to synchronize system time, receive the optical signal processed by the de-multiplexing and multiplexing module, and calculate asymmetric compensation data for the fibers. FIG. 9 is an internal block diagram of a synchronization processing module according to an embodiment of the present disclosure. As shown in FIG. 9, the synchronization processing module includes a time synchronization submodule, a time stamp processing submodule, and an auxiliary optical path submodule, where the time synchronization submodule is mainly configured to synchronize the system time; the time stamp processing submodule is mainly configured to generate a time stamp of a local board according to the system time of a clock card, receive a time stamp of a peer board, and finally calculate a path delay; and the auxiliary optical path submodule is mainly configured to receive and send an optical signal, and carry time stamp information.

In FIG. 8, an optical module having an optical wavelength of 1550 nm (hereafter referred to as 1550 nm optical module for short) is adopted to receive and send an optical signal of a master optical path and carry time stamp information, and in the compensation unit T1' and the compensation unit T2', an optical module having an optical wavelength of 1510 nm (hereafter referred to as 1510 nm optical module for short) is adopted to receive and send an optical signal of the auxiliary optical path submodule, and carry time stamp information.

A left master optical path 1550 nm optical module is located inside the service board unit A, and a right master optical path 1550 nm optical module is located inside the service board unit B. The service board A and the service board B are connected through a fiber 1. The compensation unit T2' is connected to the service board A through a fiber A, and the compensation unit T1' is connected to the service board B through a fiber B. The compensation unit T2' and the compensation unit T1' are connected through a fiber 2.

The processing flow is described as follows:

The 1588 V2 protocol is activated on the service board A and the service board B, which perform 1588 V2 time synchronization through the fiber 1 and the fiber 2. Because lengths of receiving and sending links of the fiber 1 and the fiber 2 are not equal, a fixed offset offset0 exists. The service board A and the service board B each are added with a compensation unit.

The compensation unit T1' and the compensation unit T2' both include a de-multiplexing and multiplexing module and an auxiliary optical path 1510 nm submodule. The auxiliary optical path 1510 nm submodule in the compensation unit T1' sends an optical signal, where the optical signal is transmitted to the de-multiplexing and multiplexing module of the compensation unit T2' through the de-multiplexing and multiplexing module of the compensation unit T1' and the fiber 2. After the de-multiplexing and multiplexing module of the compensation unit T2' receives the optical signal transmitted through the fiber 2, the de-multiplexing and multiplexing module sends the optical signal to the auxiliary optical path 1510 nm submodule of the compensation unit T2'. In the figure, the left master optical path 1550 nm optical module is located inside the service board B, and the right master optical path 1550 nm optical module is located inside the service board A. The master optical path 1550 nm optical module of the service board A sends an optical signal to the de-multiplexing and multiplexing module of the compensation unit T2' through the fiber A, an optical signal is transmitted to the de-multiplexing and multiplexing module of the compensation unit T1' through the fiber 2, and then sent to the service board B through the fiber B, and the master optical path 1550 nm optical module of the service board B receives, through the fiber B, the optical signal that is sent by the service board A and transmitted by the de-multiplexing and multiplexing module of the compensation unit T1'. In the fiber 2, the optical signal that is transmitted by the auxiliary 1510 nm optical path submodule of the compensation unit T1' and the optical signal that is sent through the fiber A by the master optical path 1550 nm optical module of the service board A are transmitted, that is, the bi-directional transfer of optical signals over a single fiber is implemented in the fiber 2.

The service board B sends a time stamp to the service board A through the fiber 1, and the compensation unit T1' sends a time stamp to the compensation unit T2' through the fiber 2. The service board A sends the received first time stamp to the compensation unit T2' through the fiber A, so that the time stamp processing submodule of the compensation unit T2' may calculate delays of the fiber 1 and the fiber 2 according to the two time stamps. The compensation unit T2' sends a calculated delay difference to the service board A, where a half of the delay difference is asymmetric data, that is, a compensation time value. The service board A transfers the compensation data to the service board B through a message. For the service board A or the service board B, if a port connected to the fiber 1 and/or the fiber 2 is in a Slave status, asymmetric compensation is performed for the fibers, that is, local time is corrected by using "compensation value" data so as to solve the problem of asymmetric receiving and sending links of the fiber 1 and the fiber 2.

Figure 10:
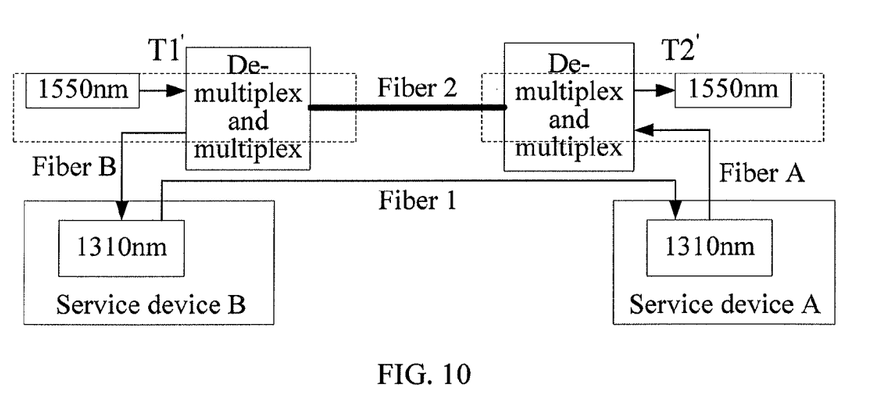
FIG. 10 is an application diagram of another device for compensating for a time path according to an embodiment of the present disclosure.

FIG. 10 is an application diagram of a device for compensating for a time path according to an embodiment of the present disclosure.

A receiving device for compensating for a time path provided by the embodiment of the present disclosure is described in detail below by taking FIG. 10 as an example and with reference to FIG. 5, where fiber compensation may be implemented automatically through the receiving device for compensating for a time path without testing an asymmetry node by node.

The receiving device for compensating for a time path as shown in FIG. 10 is a solution proposed to solve a problem in 2-40 Km. A compensation unit T2' and a compensation unit T1' are respectively added to the service board A and the service board B shown in FIG. 5. The compensation units are the same as the foregoing compensation units, so the details are not described here again.

In FIG. 10, a 1310 nm optical module is adopted to receive and send an optical signal of a master optical path and carry time stamp information, and in the compensation unit T1' and the compensation unit T2', a 1550 nm optical module is adopted to receive and send an optical signal of an auxiliary optical path submodule, and carry time stamp information.

A left master optical path 1310 nm optical module is located inside the service board unit B, and a right master optical path 1310 nm optical module is located inside the service board unit A. The service board A and the service board B are connected through a fiber 1. The compensation unit T2' is connected to the service board A through a fiber A, and the compensation unit T1' is connected to the service board B through a fiber B. The compensation unit T2' and the compensation unit T1' are connected through a fiber 2.

The processing flow is described as follows:

The 1588 V2 protocol is activated on the service board A and the service board B, which perform 1588 V2 time synchronization through the fiber 1 and the fiber 2. Because lengths of receiving and sending links of the fiber 1 and the fiber 2 are not equal, a fixed offset offset0 exists. The service board A and the service board B each are added with a compensation unit.

The compensation unit T1' and the compensation unit T2' both include a de-multiplexing and multiplexing module and an auxiliary optical path 1550 nm submodule. The auxiliary optical path 1550 nm submodule of the compensation unit T1' sends an optical signal, where the optical signal is transmitted to the de-multiplexing and multiplexing module of the compensation unit T2' through the de-multiplexing and multiplexing module of the compensation unit T1' and the fiber 2. After the de-multiplexing and multiplexing module of the compensation unit T2' receives the optical signal transmitted through the fiber 2, the de-multiplexing and multiplexing module sends the optical signal to the auxiliary optical path 1550 nm submodule of the compensation unit T2'. In the figure, the left master optical path 1310 nm optical module is located inside the service board B, and the right master optical path 1310 nm optical module is located inside the service board A. The master optical path 1310 nm optical module of the service board A sends an optical signal to the de-multiplexing and multiplexing module of the compensation unit T2' through the fiber A, the optical signal is transmitted to the de-multiplexing and multiplexing module of the compensation unit T1' through the fiber 2, and then sent to the service board B through the fiber B, and the master optical path 1310 nm optical module of the service board B receives, through the fiber B, the optical signal that is sent by the service board A and transmitted by the de-multiplexing and multiplexing module of the compensation unit T1'. In the fiber 2, the optical signal that is sent by the auxiliary 1550 nm optical path submodule of the compensation unit T1' and the optical signal that is sent through the fiber A by the master optical path 1310 nm optical module of the service board A are transmitted, that is, the bi-directional transfer of optical signals over a single fiber is implemented in the fiber 2.

The service board B sends a time stamp to the service board A through the fiber 1, and the compensation device T1' sends a time stamp to the compensation device T2' through the fiber 2. The service board A sends the received first time stamp to the compensation unit T2' through the fiber A, so that the time stamp processing submodule of the compensation device T2' may calculate delays of the fiber 1 and fiber 2 according to the two time stamps. The compensation device T2' sends a calculated delay difference to the service board A, where a half of the delay difference is asymmetric data, that is, a compensation time value. The service board A transfers the compensation data to the service board B through a message. For the service board A or the service board B, if a port connected to the fiber 1 and the fiber 2 is in a Slave status, asymmetric compensation is performed for the fibers, that is, local time is corrected by using "compensation value" data so as to solve the problem of asymmetric receiving and sending links of the fiber 1 and the fiber 2.

Figure 11:
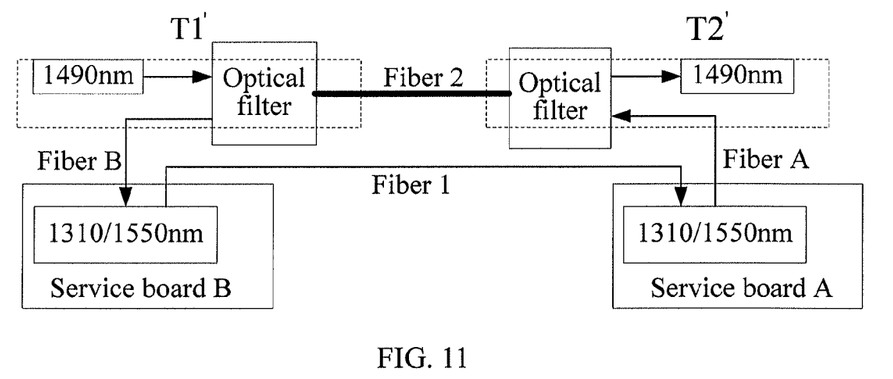
FIG. 11 is an application diagram of still another device for compensating for a time path according to an embodiment of the present disclosure.

FIG. 11 is an application diagram of a device for compensating for a time path according to an embodiment of the present disclosure.

A time auxiliary board provided by the embodiment of the present disclosure is described in detail below by taking FIG. 11 as an example and with reference to FIG. 5, where fiber compensation may be implemented automatically through the time auxiliary board without testing an asymmetry node by node.

Compensation units as shown in FIG. 11 are a solution proposed to solve a problem in 2-80 Km. A compensation unit T2' and a compensation unit T1' are respectively added to the service board A and the service board B shown in FIG. 5. The compensation unit includes an optical filter module and a synchronization processing module. The optical filter module mainly functions to select an optical signal that is in the compensation unit and has a corresponding wavelength of an auxiliary optical path submodule, so as to distinguish an optical wave on the service board A/service board B and an optical wave on the compensation unit T2'/compensation unit T1'. The synchronization processing module is mainly configured to synchronize system time, receive and send the optical signal processed by the optical filter module, and calculate asymmetric compensation data for the fibers. The synchronization processing module has the same internal structure as that of the synchronization processing module shown in FIG. 9. The internal structure of the synchronization processing module and functions of each part of the synchronization processing module have been described above, so the details are not be described here again.

In FIG. 11, a 1310/1550 nm optical module is adopted to receive and send an optical signal of a master optical path and carry time stamp information, and in the compensation device T1' and the compensation device T2', a 1490 nm optical module is adopted to receive and send an optical signal of the auxiliary optical path submodule and carry time stamp information.

A left master optical path 1310/1550 nm optical module is located inside the service board unit A, and a right master optical path 1310/1550 nm optical module is located inside the service board unit B. The service board A and the service board B are connected through a fiber 1. The compensation unit T2' is connected to the service board A through a fiber A, and the compensation unit T1' is connected to the service board B through a fiber B. The compensation unit T2' and the compensation unit T1' are connected through a fiber 2.

The processing flow is described as follows:

The 1588 V2 protocol is activated on the service board A and the service board B, which perform 1588 V2 time synchronization through the fiber 1 and the fiber 2. Because lengths of receiving and sending links of the fiber 1 and the fiber 2 are not equal, a fixed offset offset0 exists. The service board A and the service board B each are added with a compensation unit.

The compensation unit T1' and the compensation unit T2' both include an optical filter module and an auxiliary optical path 1490 nm submodule. The auxiliary optical path 1490 nm submodule of the compensation unit T1' sends an optical signal, where the optical signal is transmitted to the optical filter module of the compensation unit T2' through the optical filter module of the compensation unit T1' and the fiber 2. After the optical filter module of the compensation unit T2' receives the optical signal that is transmitted through the fiber 2, the optical filter module sends the optical signal to the auxiliary optical path 1490 nm submodule of the compensation unit T2'. In the figure, the left master optical path 1310/1550 nm optical module is located inside the service board B, and the right master optical path 1310/1550 nm optical module is located inside the service board A. The master optical path 1310/1550 nm optical module of the service board A sends an optical signal to the optical filter module of the compensation unit T2' through the fiber A, the optical signal is transmitted to the optical filter module of the compensation unit T1' through the fiber 2, and then sent to the service board B through the fiber B, and the master optical path 1310/1550 nm optical module of the service board B receives, through the fiber B, the optical signal that is sent by the service board A and transmitted by the optical filter module of the compensation unit T1'.

In the fiber 2, the optical signal that is sent by the auxiliary 1490 nm optical path submodule of the compensation unit T1' and the optical signal that is sent through the fiber A by the master optical path 1310/1550 nm optical module of the service board A are transmitted, that is, the bi-directional transfer of optical signals over a single fiber is implemented in the fiber 2.

The service board B sends a time stamp to the service board A through the fiber 1, and the compensation device T1' sends a time stamp to the compensation device T2' through the fiber 2. The service board A sends the received first time stamp to the compensation unit T2' through the fiber A, so that the time stamp processing module of the compensation device T2' may calculate delays of the fiber 1 and the fiber 2 according to the two time stamps. The compensation device T2' sends a calculated delay difference to the service board A, where a half of the delay difference is asymmetric data, that is, a compensation time value. The service board A transfers the compensation data to the service board B through a message. For the service board A or the service board B, if a port connected to the fiber 1 and the fiber 2 is in a Slave status, asymmetric compensation is performed for the fibers, that is, local time is corrected by using "compensation value" data so as to solve the problem of asymmetric receiving and sending links of the fiber 1 and the fiber 2.

Figure 12:
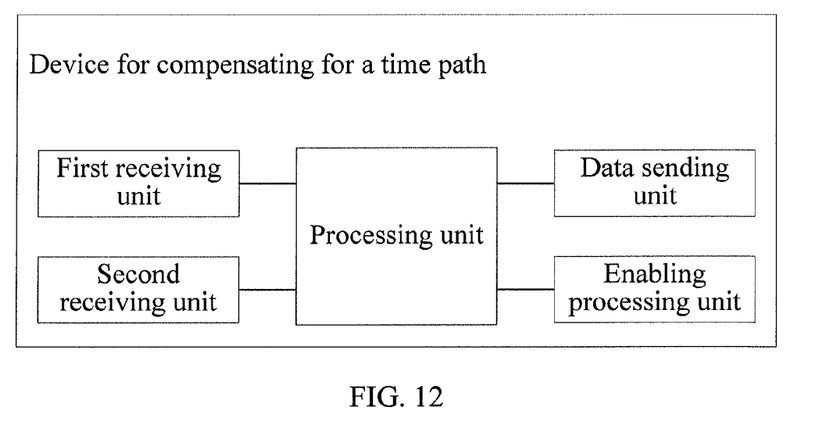
FIG. 12 is a block diagram of a virtual device for compensating for a time path according to an embodiment of the present disclosure.

Detailed descriptions of a virtual device that corresponds to the method for compensating for a time path provided by the embodiment of the present disclosure are provided below with reference to FIG. 12. FIG. 12 is a block diagram of a virtual device for compensating for a time path according to an embodiment of the present disclosure.

The device for compensating for a time path includes a first receiving unit configured to receive a first time stamp that is sent through a first fiber by a service board unit. A service board A and a service board B each are added with a compensation unit. The service board A and the compensation unit T2' are connected through a fiber A, and the service board B and the compensation unit T1' are connected through a fiber B. The service board B sends the first time stamp to the service board A through the fiber 1, and the first receiving unit receives the first time stamp that is sent through the fiber 1 by the service board B to the service board A.

A second receiving unit is configured to receive a second time stamp that is sent through a second fiber by a compensation unit, where the second receiving unit receives the second time stamp that is sent through the fiber 2 by the compensation unit T1' to the compensation unit T2'.

A processing unit is configured to calculate a path delay of the first fiber according to the first time stamp, calculate a path delay of the second fiber according to the second time stamp, and use a half of a difference between the path delay of the first fiber path delay and the path delay of the second fiber as a path compensation time value.

A data sending unit is configured to send the path compensation time value to the service board unit. The compensation unit T2' sends the calculated delay difference to the service board A, and sends a data message according to the path compensation time value. The service board A transfers the compensation data to the service board B through a message, where a half of the delay difference is asymmetric data, that is, a compensation time value.

An enabling processing unit is configured to perform synchronization enabling processing automatically according to the path compensation time value. For the service board A or the service board B, if a port connected to the fiber 1 and the fiber 2 is in a Slave status, asymmetric compensation is performed for the fibers, that is, local time is corrected by using "compensation time value" data so as to solve the problem of asymmetric receiving and sending links of the fiber 1 and the fiber 2.

Those skilled in the art may further understand that the solutions of the present disclosure may be implemented in the form of electronic hardware, computer software, or integration of the hardware and software by combining the exemplary units and algorithm steps described in the embodiments of the present disclosure. To clearly describe the exchangeability of the hardware and software, the above description has generally described the constitution and steps of each embodiment by function. Whether the functions are executed by hardware or software depends on particular applications and design constraint conditions of the solutions. A person skilled in the art may use different methods to implement the described functions for each specific application. However, such implementation should not be considered as beyond the scope of the present disclosure.

The steps of a method or algorithm described in combination with the embodiments disclosed here may be embodied directly in hardware, in a software module executed by a processor, or in a combination of the two. The software module may be located in a Random Access Memory (RAM), a computer memory, a Read Only Memory (ROM), an Electrically Programmable Read Only Memory (EPROM), an Electrically Erasable Programmable Read Only Memory (EE- PROM), a register, a hard disk, a removable disk, a Compact Disk-Read Only Memory (CD-ROM), or any other storage media well-known in the art.

The objectives, solutions, and benefits of the embodiments of the present disclosure are described in detail above. Although the present disclosure is described in detail with reference to some embodiments, those embodiments are not intended to limit the protection scope of the present disclosure. Any modification, equivalent replacement, or improvement made to the embodiments of the present disclosure without departing from the spirit and principles of the present disclosure shall fall into the protection scope of the present disclosure.

What is claimed is:

1. A method for calculating a path compensation time value in a first communication apparatus, wherein the first communication apparatus is connected to a second apparatus comprising a service board unit and a compensation unit through a first fiber and a second fiber, and the path compensation time value is used to compensate transmission delay asymmetry between transmission delay introduced by the first fiber and transmission delay introduced by the second fiber, the method comprising:
    receiving a first time stamp comprised in a first data packet that is sent by the service board unit through the first fiber, wherein the first time stamp indicates the transmitting time of the first data packet;
    receiving a second time stamp comprised in a second data packet that is sent by the compensation unit through the second fiber, wherein the second time stamp indicates the transmitting time of the second data packet;
    calculating a transmission delay introduced by the first fiber according to the first time stamp, calculating a transmission delay introduced by the second fiber according to the second time stamp, and calculating the path compensation time value, wherein the path compensation time value equals to a half of a difference between the transmission delay introduced by the first fiber and the transmission delay introduced by the second fiber.

2. The method according to claim 1, comprising:
    sending the path compensation time value to the second apparatus.

3. The method according to claim 1, further comprising: implementing asymmetric compensation processing for receiving and sending links of the first fiber and the second fiber according to the path compensation time value.

4. A device for calculating a path compensation time value, wherein the device is connected to a remote device comprising a service board unit and a compensation unit through a first fiber and a second fiber, and the path compensation time value is used to compensate transmission delay asymmetry between transmission delay introduced by the first fiber and transmission delay introduced by the second fiber, the device comprising:
    a first receiving unit, configured to receive a first time stamp comprised in a first data packet that is sent by the service board unit through the first fiber, wherein the first time stamp indicates the transmitting time of the first data packet;
    a second receiving unit, configured to receive a second time stamp comprised in a second data packet that is sent by the compensation unit through the second fiber, wherein the second time stamp indicates the transmitting time of the second data packet;
    a processing unit, configured to calculate a transmission delay introduced by the first fiber according to the first time stamp, calculating a transmission delay introduced by the second fiber according to the second time stamp, and calculating the path compensation time value, wherein the path compensation time value equals to a half of a difference between the transmission delay introduced by the first fiber and the transmission delay introduced by the second fiber.

5. The device according to claim 4, further comprising a data sending unit, wherein the data sending unit is configured to send the path compensation time value to the service board unit, so that the service board unit sends the data message according to the path compensation time value.

6. The device according to claim 4, further comprising: an enabling processing unit, configured to implement asymmetric compensation processing for receiving and sending links of the first fiber and the second fiber according to the path compensation time value.

* * * * *